(12) United States Patent
Riebe (10) Patent No.: US 10,739,588 B2
(45) Date of Patent: Aug. 11, 2020

(54) PROJECTION DEVICE FOR A HEAD-UP DISPLAY, HEAD-UP DISPLAY, AND VEHICLE

(71) Applicant: Bayerische Motoren Werke Aktiengesellschaft, Munich (DE)

(72) Inventor: Mark Riebe, Kranzberg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 155 days.

(21) Appl. No.: 16/104,498

(22) Filed: Aug. 17, 2018

(65) Prior Publication Data

US 2018/0356634 A1  Dec. 13, 2018

Related U.S. Application Data

(63) Continuation of application No. PCT/EP2017/053347, filed on Feb. 15, 2017.

(30) Foreign Application Priority Data

Feb. 18, 2016  (DE) .................... 10 2016 202 464

(51) Int. Cl.
  *G02B 27/01* (2006.01)
  *B60K 35/00* (2006.01)
  *G02B 1/11* (2015.01)

(52) U.S. Cl.
  CPC .......... *G02B 27/0101* (2013.01); *B60K 35/00* (2013.01); *B60K 2370/334* (2019.05); *B60K 2370/736* (2019.05); *G02B 1/11* (2013.01); *G02B 2027/012* (2013.01)

(58) Field of Classification Search
  None
  See application file for complete search history.

(56) References Cited

U.S. PATENT DOCUMENTS

| 5,486,840 A | 1/1996 | Borrego et al. |
| 2003/0147145 A1 | 8/2003 | Robinson et al. |

(Continued)

FOREIGN PATENT DOCUMENTS

| DE | 3347271 A1 * | 7/1985 | ............... G01D 7/00 |
| DE | 10 2014 211 339 A1 | 12/2015 | |
| DE | 102017212445 A1 * | 1/2019 | ........... G02B 27/286 |

(Continued)

OTHER PUBLICATIONS

Machine translation of JP 2012113127 downloaded from Espacenet Mar. 12, 2020 (Year: 2020).*

(Continued)

*Primary Examiner* — Cara E Rakowski
(74) *Attorney, Agent, or Firm* — Crowell & Moring LLP (57) ABSTRACT

A projection apparatus for a head-up display includes an imaging unit designed to produce an image, a projection unit designed to project the image produced by the imaging unit via a projection path onto a projection surface. The projection device includes a convex optical element arranged in the projection path, which is provided with a circular polarizer or is formed as a circular polarizer. The invention further relates to a head-up display having such a projection apparatus and to a corresponding vehicle having such a projection apparatus.

8 Claims, 3 Drawing Sheets

(56) References Cited

U.S. PATENT DOCUMENTS

2016/0377868 A1* 12/2016 Ouderkirk ............ G02B 6/0046
359/485.01
2017/0235136 A1* 8/2017 Kim ...................... B60K 35/00
359/485.07

FOREIGN PATENT DOCUMENTS

| JP | 2012-113127 A | | 6/2012 |
|---|---|---|---|
| JP | 2012113127 A | * | 6/2012 |
| JP | 2015-222337 A | | 12/2015 |

OTHER PUBLICATIONS

Machine translation of DE 102017212445A1 downloaded from Espacenet Mar. 16, 2020 (Year: 2020).*
Machine translation of DE 3347271 A1 downloaded from Espacenet Mar. 16, 2020 (Year: 2020).*
International Search Report (PCT/ISA/210) issued in PCT Application No. PCT/EP2017/053347 dated Apr. 24, 2017 with English translation (four (4) pages).
German-language Written Opinion (PCT/ISA/237) issued in PCT Application No. PCT/EP2017/053347 dated Apr. 24, 2017 (six (6) pages).
German-language Search Report issued in counterpart German Application No. 10 2016 202 464.7 dated Dec. 6, 2016 with partial English translation (thirteen (13) pages).

* cited by examiner

Fig. 5D        Fig. 5E

PROJECTION DEVICE FOR A HEAD-UP DISPLAY, HEAD-UP DISPLAY, AND VEHICLE

CROSS REFERENCE TO RELATED APPLICATIONS

This application is a continuation of PCT International Application No. PCT/EP2017/053347, filed Feb. 15, 2017, which claims priority under 35 U.S.C. § 119 from German Patent Application No. 10 2016 202 464.7, filed Feb. 18, 2016, the entire disclosures of which are herein expressly incorporated by reference.

BACKGROUND AND SUMMARY OF THE INVENTION

The present invention relates to a projection apparatus for a head-up display, to a head-up display having such a projection apparatus, and to a vehicle having such a head-up display.

A head-up display in a vehicle is tasked with visually representing information within the natural field of view of the driver. The natural field of view corresponds to the vehicle's surrounding area, which the driver must primarily observe during the operation of the vehicle, e.g. the road section in front of a car. The relevant information is here projected by a projection apparatus onto a suitable projection surface, e.g. a windshield, and reflected here such that the driver can visually perceive the information without having to move his gaze away from the surrounding area that is to be primarily observed during the operation of the vehicle, which significantly increases the operational safety of a vehicle that is equipped with such a head-up display.

In order to ensure reliable function in different situations, in particular under varying illumination conditions, it is necessary in a head-up display to take measures to keep light that is incident from outside the vehicle, in particular sunlight, out of the beam path of the projection apparatus or at least to reduce the penetration of light. Light that is reflected at the surfaces of optical elements of the projection apparatus otherwise results in reflections which can become noticeable within the field of view of the driver and, in an extreme case, can dazzle him, or at least irritate him and/or superimpose on the information to be visualized and possibly render said information unreadable.

It is the object of the present invention to specify a projection apparatus for a head-up display, a head-up display having such a projection apparatus, and a corresponding vehicle, in which the occurrence of disturbing light reflections is reliably avoided or at least reduced.

The projection apparatus according to the invention has an imaging unit, which is designed for producing an image, and a projection unit, which is designed for projecting the image, which has been produced by the imaging unit, via a projection path onto a projection surface, and is characterized by a curved optical element arranged in the projection path, said curved optical element being provided with a circular polarizer or being designed as a circular polarizer.

The head-up display according to the invention has a projection surface, in particular a front window of a vehicle, and a projection apparatus according to the invention.

The vehicle according to the invention, in particular motor vehicle, has a projection surface, in particular in the form of a front window, and a projection apparatus according to the invention.

The invention is based on the approach of providing a curved circular polarizer, or a curved optical element that is provided with a circular polarizer, in the projection path. The curved circular polarizer, or the curved optical element that is provided with the circular polarizer, is situated between the projection surface, in particular a windshield, and the imaging unit, for example a display. The curvature of the surface of the circular polarizer, or of the optical element that is provided with the circular polarizer, is preferably concave on the side that faces the projection surface. The curved circular polarizer, or the curved optical element that is provided with a circular polarizer, is shaped and/or arranged in the projection path in a manner such that some of the unpolarized light that is incident from the projection surface, such as sunlight, is reflected on the concave side in a manner such that it is not returned onto the projection surface. This prevents this component of the light, which is reflected at the circular polarizer, or at the optical element that is provided with the circular polarizer, from appearing within the field of view of the driver in the form of a disturbing reflection. However, since the curved circular polarizer, or the curved optical element that is provided with the circular polarizer, must be transmissive at least in a specific wavelength range for the image that is produced by the imaging apparatus and is projected onto the projection surface by the projection apparatus, it is unavoidable that a portion of the unpolarized light that is incident from the projection surface passes through the circular polarizer, or through the optical element that is provided with the circular polarizer. During passage through the circular polarizer, a first polarization direction is imparted on said component of the unpolarized light that is incident from the projection surface, wherein the mutually perpendicular components thereof are delayed by a phase of $\pi/2$, such that it is circularly polarized in the interior of the projection apparatus. After a reflection at a surface of an optical element which is situated in the projection apparatus, e.g. a mirror or a lens, the circular polarizer, or the optical element that is provided with the circular polarizer, now acts in the opposite propagation direction of the circularly polarized light as an absorber, because the phase delay of the two mutually perpendicular components now produces a second polarization direction, which is perpendicular to the first polarization direction. The circular polarizer, or the optical element that is provided with the circular polarizer, consequently prevents exit of the light, which is reflected at surfaces of optical elements of the projection apparatus, in the direction of the projection surface, with the result that any occurrence of reflections within the field of view of the driver is prevented or at least considerably reduced due to the light that is reflected at surfaces of the optical elements situated in the projection apparatus.

Overall, the invention consequently prevents the components of light, in particular of sunlight, which is incident on the projection apparatus from outside, i.e. both the component that is reflected at the curved circular polarizer, or at the curved optical element, and the component that is reflected at further optical elements in the interior of the projection apparatus, from appearing within the field of view of the driver in the form of disturbing reflections. The formation of undesired reflections in the natural field of view of the driver is hereby prevented or at least significantly reduced.

It is advantageous if, as an additional measure for the reduction of disturbing reflections, the surfaces of the optical elements situated in the projection apparatus are provided with anti-reflection coatings or anti-reflection surface structures. The component of the light that is reflected in the interior of the projection apparatus, in particular at the surfaces of optical elements in the projection path of the projection apparatus, and, upon another passage through the circular polarizer, must be absorbed thereby, is consequently reduced. The occurrence of disturbing reflections in the natural field of view of the driver is hereby even more reliably suppressed or reduced.

It is furthermore advantageous if the curved circular polarizer, or the curved optical element that is provided with the circular polarizer, is arranged such that light that is incident from the projection surface is steered, by reflection at the concave side of the circular polarizer, or of the optical element that is provided with the circular polarizer, onto a beam dump, e.g. an absorbing optical element. This reliably prevents light that is incident from the projection surface and is reflected by the concave surface of the circular polarizer, or of the optical element, from being incident on the projection surface and from being perceived there by the driver as a disturbing reflection.

Alternatively or additionally, the curved circular polarizer, or the curved optical element that is provided with the circular polarizer, is designed and/or arranged such that light that is coming from the region of the driver's eyes, is reflected at the projection surface and is incident on the curved element is steered, by reflection at the concave side of the circular polarizer, or of the optical element that is provided with a circular polarizer, onto a beam dump, e.g. an absorbing optical element. As a result, light that is coming from the region of the driver's eyes (aka eyebox) is also absorbed by the beam dump such that it is reliably ensured that all beam paths that would cause disturbing reflections in the region of the driver's eyes are suppressed.

In a preferred embodiment, the circular polarizer includes a linearly polarizing element and a quarter-wave layer. Unpolarized light that is incident on the linearly polarizing element in particular from outside the vehicle has, after passage through the linearly polarizing element, only a single oscillation direction, i.e. a fixed polarization. The quarter-wave layer is oriented such that two mutually perpendicular components of the light that is polarized in this oscillation direction are delayed upon passage through the quarter-wave layer such that their phase difference is exactly $\pi/2$, as a result of which the oscillation direction of the now circularly polarized light has, as viewed from a spatially fixed point, the form of a helix. It is thus ensured in a simple manner and with high reliability that incident unpolarized light is circularly polarized upon penetration into the projection apparatus.

In a further preferred embodiment, the quarter-wave layer is arranged, as viewed in the direction of the projection path during the projection of the image onto the projection surface, upstream of the linearly polarizing element. Light that is incident in the projection apparatus from outside consequently first passes through the linearly polarizing element and then the quarter-wave layer and is thereby circularly polarized in a simple and reliable fashion. Conversely, the light which is subsequently reflected in the interior of the projection apparatus at surfaces of optical elements passes, before it exits the projection apparatus, first the quarter-wave layer and then the linearly polarizing element. The circular polarizer, or the optical element that is provided with the circular polarizer, acts as an absorber due to the now opposite propagation direction of the circularly polarized light, because the phase delay of the two mutually perpendicular components of the light due to the quarter-wave layer now produces a second polarization direction, which is perpendicular to the first polarization direction, with the result that the light which is thus linearly polarized is absorbed by the linearly polarizing optical element that is situated therebehind. As a result, exit of the light, which has been reflected at surfaces of optical elements in the projection apparatus, in a direction of the projection surface is prevented or at least considerably reduced.

In a further preferred embodiment, the optical element is designed as a curved, transparent plate, in particular a glass or plastics plate. The circular polarizer is attached to this curved, transparent plate, in particular laminated on. Due to this design of the optical element, a reliable circular polarization of the incident unpolarized light with simultaneous simple production is ensured. Moreover, an optical element which is designed in this fashion can be installed in a highly space-saving manner, i.e. only a small installation space is required.

In an advantageous embodiment, a first side of the optical element is concavely curved, and a second side of the optical element is convexly curved. The extent of the curvature on the first and second sides of the optical element is preferably identical. Consequently, the optical element is thin, lightweight and space-saving and can be easily installed in the projection apparatus.

In a further advantageous embodiment, the circular polarizer is attached to the second side, i.e. the convexly curved side, of the optical element, in particular laminated on. Consequently, the reflection properties of the first side, i.e. the concave side, of the optical element with respect to the light that is incident from outside can be optimized independently of the implementation of the circular polarizer, which for its part can be optimized in particular with respect to the polarizing or polarization-rotating properties independently of the design of the reflective first side of the optical element. Undesired reflections within the field of view of the driver are hereby particularly reliably prevented or at least reduced.

In a further advantageous embodiment, the first side, i.e. the concave side, of the optical element faces toward the projection surface. Optionally, the second side, i.e. the convex side, of the optical element faces the projection unit. The optical element is hereby particularly expediently aligned in order to at least partially reflect light, which is incident from outside and/or light which is coming from the region of the driver's eyes, is reflected at the projection surface and is incident on the first side of the optical element, in a manner such that it can no longer reach the projection surface and cause here disturbing reflections within the field of view of the driver. In a preferred embodiment, the concavely curved surface of the optical element has a focusing effect, such that reflected light is steered in a controlled fashion in a direction in which the occurrence of reflections that are perceived by the driver as dazzling or at least disturbing is particularly reliably avoided. Furthermore, a portion of the light which is incident on the projection apparatus from outside, such as e.g. sunlight, is hereby efficiently reflected at the first side of the optical element, even before the remaining portion of the light passes through the circular polarizer. Consequently, the intensity of the light which passes into the projection apparatus is decreased, such that undesired reflections within the field of view of the driver are particularly reliably prevented or further reduced.

In a particularly preferred embodiment, the projection apparatus has a beam trap, which is arranged and/or designed such that it swallows, in particular absorbs, light rays which are incident on and reflected at the first side of the optical element. What is hereby prevented with particular high reliability is that light which is incident from the outside and reflected at the optical element is visually perceived by the driver as a disturbing reflection. It is advantageous if the beam trap is arranged in the direct neighborhood of the curved optical element, in particular next to the curved optical element. In this way, the beam trap and the curved optical element can be installed in a space-saving manner.

In a further preferred embodiment, the projection unit includes at least one further optical element, in particular a mirror, a mirror system, a lens, a lens system or a light guide, wherein at least one surface of the at least one further optical element has an anti-reflective layer. As a result, the component of the circularly polarized light that is reflected at the at least one surface of the at least one further optical element is reduced, typically by a factor of 4 to 5. Undesired reflections in the field of view of the driver due to reflections of the light that penetrates the projection apparatus from the outside and is reflected here at surfaces of optical elements are in this way particularly reliably prevented or further reduced.

In a further, particularly preferred embodiment, the projection apparatus has a housing, which encloses the projection apparatus and has an exit window through which the image that has been produced by the imaging unit is projected onto the projection surface. The exit window is here preferably formed by the optical element. The optical element preferably acts as a cover glass of the housing. In these embodiments, the curved circular polarizer, or the optical element that is provided with a circular polarizer, serves not only to reduce or prevent disturbing reflections in the field of view of the driver, but moreover offers effective and easy-to-realize protection of the components of the projection apparatus against ingress of dirt and dust, which could restrict the ability of the projection unit to function.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
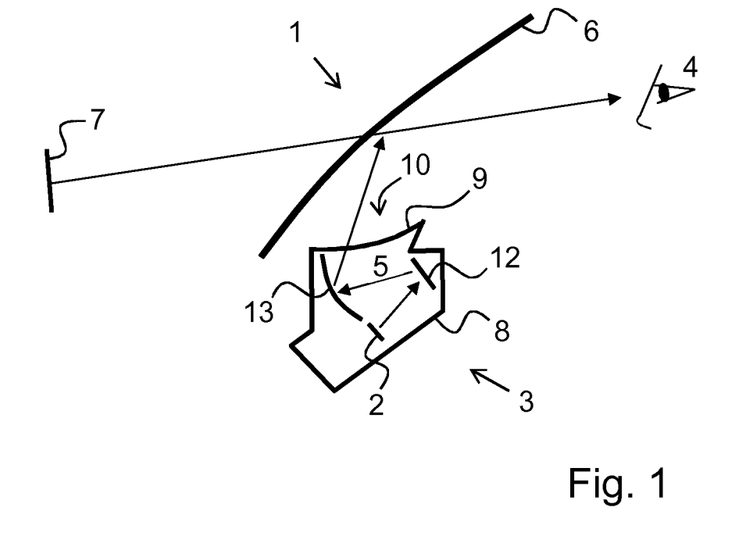
FIG. 1 shows an example of a head-up display in a cross-sectional illustration of an embodiment of the present invention.

FIG. 1 shows an example of a head-up display 1 having a projection apparatus 3, which includes an imaging unit 2 and a projection unit. The imaging unit 2 can be for example a display, preferably a display with thin-layer transistor control (known as TFT display) and background lighting. Produced by the imaging unit 2 is an image that is projected by the projection unit into the field of view of a driver 4, and can be visually perceived by him. To this end, the projection unit includes optical elements 12 and 13, through which the image, which has been produced by the imaging unit 2, is projected along a projection path 5 onto a projection surface 6, preferably the front window of a vehicle, and is here reflected in the direction of the driver 4 (arrows).

In a preferred embodiment, the imaging unit 2 is designed as a display that emits light not only perpendicularly to the surface thereof, but also into a solid angle region around the surface normal. In this embodiment, the imaging unit 2 is arranged so as to be preferably tilted with respect to the projection path 5, wherein the projection path 5 is located in the solid angle region, into which the imaging unit 2 emits light. As a result, light, such as sunlight, which is incident in the projection apparatus 3 from outside and strikes the imaging unit 2 along the projection path 3, is easily prevented from being reflected back into the projection path 3 and being perceived in the field of view of the driver 4 as a disturbing reflection.

In the present example, the projection unit includes a plane mirror 12 and a concave mirror 13, which magnifies the image that is produced by the imaging unit 2. In alternative embodiments, the protection unit can also include other and/or additional and/or fewer optical elements, as is explained in more detail further below in connection with the examples shown in FIG. 5. The plane mirror 12 and the concave mirror 13, or in the alternative embodiments the other optical elements, guide the light that has been emitted by the imaging unit 2 along the projection path 5 to the exit from the projection unit 3. It is ensured here that the image that is produced in this way on the projection surface 6 is sharp and sufficiently large.

In the present example, the projection surface 6 is formed by the front window of a vehicle. In an alternative embodiment, a transparent or at least partially transparent surface, for example a glass or plastics plate, which is arranged for example in front of the front window of the vehicle, can serve as the projection surface.

The light that is radiated onto the projection surface 6 is reflected hereby at least partially in the direction of the driver 4. The driver 4 consequently perceives the image which has been produced by the imaging unit 2 as a virtual image 7. In the present arrangement with a magnifying concave mirror 13 in the projection unit, the virtual image 7 appears enlarged with respect to the image which has been produced by the imaging unit 2. Hereby, the imaging unit 2 can be kept small and the projection apparatus 3 can be correspondingly installed in a space-saving fashion. The virtual image 7 is situated in the natural field of view of the driver 4, such that the driver 4 can read the information that is presented by the image without moving his gaze away from the vehicle's surrounding area, for example from a road section situated in front of the vehicle.

In a preferred design, the mirrors 12 and 13, or the optical elements of the projection unit which are provided in alternative embodiments in the projection path 5, are designed as adaptive elements having reflection and imaging properties that are variable, in particular controllable during the operation of the head-up display, such that e.g. the propagation direction of the light can be changed. As a result, the imaging of the image which has been produced by the imaging unit 2 can be adapted to the respective field of view of the driver 4. Here, in particular the positioning of the head of the driver 4 can be taken into account.

Figure 4A:
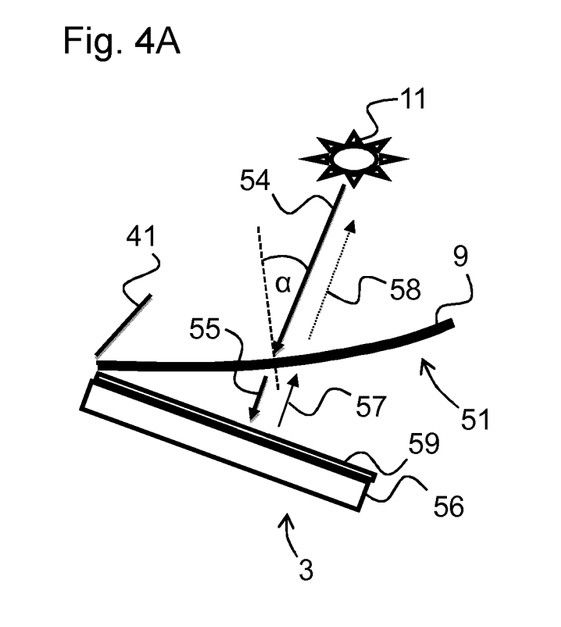
FIG. 4A shows a detail from a further example of a head-up display of an embodiment of the present invention and FIG. 4B shows an enlarged detail from the curved optical element, both in cross-sectional illustration.

The projection apparatus 3 in FIG. 1 is enclosed by a housing 8, which has an exit window 10. The exit window 10 is formed as a curved optical element 9, which is provided with a circular polarizer or is designed as a circular polarizer and will be described in more detail further below in connection with FIG. 4. As is illustrated in this representation, the exit window 10 is curved and preferably arranged such that a first, concavely curved side of the window 10 faces the projection surface 6, whereas a second, convexly curved side of the window 10 is situated in the interior of the projection apparatus 3 and faces the optical components 12 and 13 of the projection unit.

The exit window 10 closes the housing 8 of the projection apparatus 3 and consequently acts as a cover glass for the projection apparatus 3. It is preferably attached to the housing 8 such that it can be removed, with the result that it is easily replaceable in case of damage, for example a scratch, which might impair the representation of the virtual image 7.

The housing 8 in a preferred embodiment (not illustrated) is installed in the dashboard of the vehicle, in particular behind the steering wheel, such that it does not project beyond the dashboard. This prevents the field of view of the driver 4 from being restricted by the housing 8.

Figure 2:
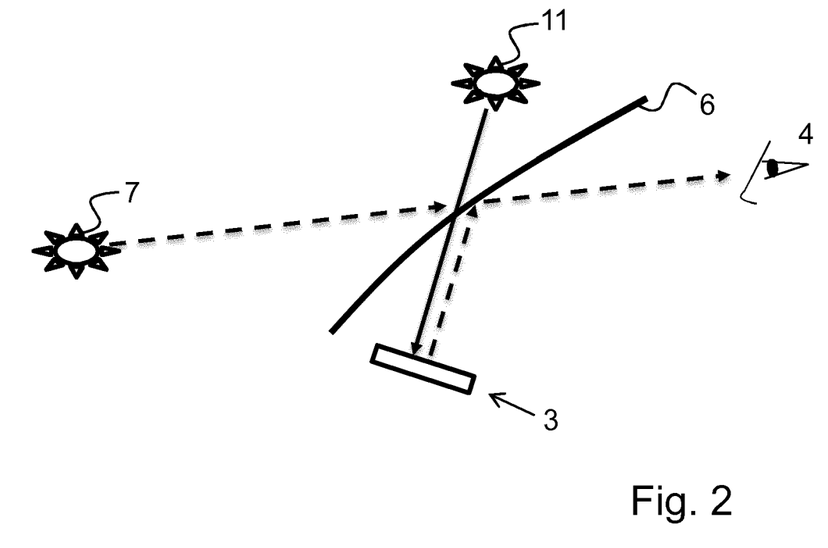
FIG. 2 shows an example to illustrate the formation of disturbing light reflections in the field of view of a driver in a head-up display of an embodiment of the present invention.

FIG. 2 shows an example of illustrating the formation of disturbing light reflections in the field of view of a driver 4 in a head-up display. Sunlight 11 passes through the front window, which in this case forms the projection surface 6 of the head-up display, and is incident on one or more surfaces of one or more optical elements of the projection apparatus 3, which is indicated only schematically in the present illustration.

The surfaces of the optical element, or of the optical elements, reflect at least a portion of the incident sunlight, which will then be incident together with the light that is emitted by the imaging unit (not illustrated) on the projection surface 6 and steered from here into the field of view of the driver 4 (dashed arrows). The driver 4 then perceives the virtual image 7 of the reflected sunlight in the form of a disturbing reflection. Due to the generally high intensity of incident sunlight, the driver 4 is frequently dazzled or at least vexed by such reflections if the sun reflections superimpose on the image which has been produced by the imaging unit in the field of view.

Figure 3:
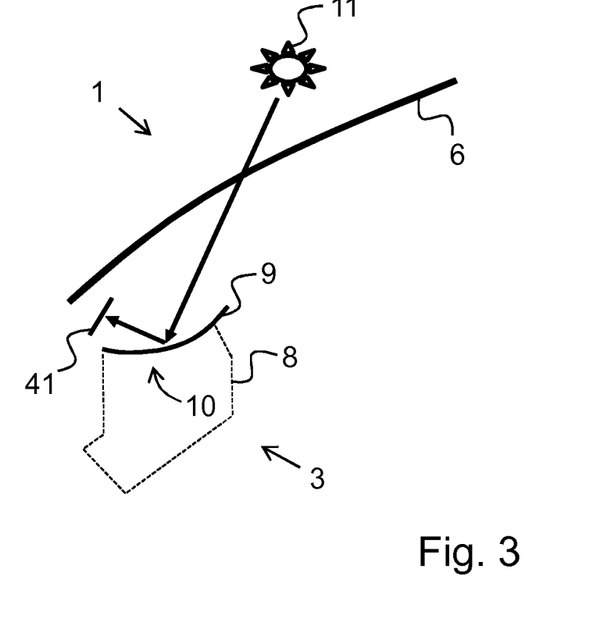
FIG. 3 shows a further example of a head-up display in a cross-sectional illustration of an embodiment of the present invention.

FIG. 3 shows a further example of a head-up display 1 in a cross-sectional illustration. As in the example shown in FIG. 1, a curved optical element 9, which is provided with a circular polarizer or forms a curved circular polarizer, is provided as the exit window 10 of the housing 8 of the projection apparatus 3. A concavely curved side of the curved optical element 9, or of the curved circular polarizer, is situated on the side of the projection surface 6, whereas the convexly curved side of the element 9 or of the circular polarizer is situated on the side of the projection unit.

In the present example, a beam trap 41 is provided, which is arranged between the curved optical element 9 and the projection surface 6, in particular the front window, and which swallows, in particular absorbs, the light that has been reflected at the concave surface of the optical element 9. Hereby, light, such as sunlight or light from street illumination, which is incident from the outside is reliably prevented from being projected, following a reflection at the optical element 9, to the projection surface 6 and from here into the field of view of the driver 4 and from being perceived as a disturbing reflection.

In this example, the curvature of the optical element 9 is particularly advantageous, because reflected light can thereby be focused particularly reliably onto the beam trap 41. Hereby, the occurrence of reflections which are caused by scattering of the light that is reflected at the curved optical element 9 is prevented or at least significantly reduced.

The optical element 9 is preferably arranged and/or curved such that light which is incident on the optical element 9, coming from the region of the eyes of the driver 4 (aka eyebox) and is reflected at the projection surface 6, is steered, in particular focused, onto the beam trap 41 and can be absorbed here. In this way, light coming from the region of the eyes of the driver 4 can hereby be reliably prevented from traveling back into the eyebox of the driver due to another reflection at the projection surface 6.

Figure 4B:
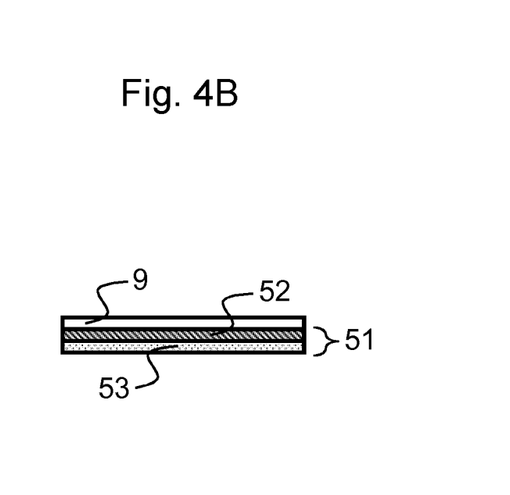

FIG. 4A shows a detail of a further example of a head-up display for further illustration of the function of a curved optical element 9, provided with a circular polarizer 51, of the projection apparatus 3. FIG. 4B shows an enlarged detail of the curved optical element 9 which is provided with the circular polarizer 51.

The curved optical element 9 can be formed for example as a glass or plastics plate and obtain its curvature by casting and/or molding.

The circular polarizer 51 preferably has a linearly polarizing element 52, for example a dichroic or birefringent film, which has a first axis in the film plane and allows components of the light in the direction of the first axis to pass, but absorbs or refracts components of the light which are perpendicular thereto.

Connected downstream of the linearly polarizing element 52 is a retardation plate 53, in particular a quarter-wave layer, which has a second axis and, with suitable orientation of the polarization direction of the light, delays two mutually perpendicular components of the light by a phase of $\pi/2$ with respect to one another, as a result of which the polarization direction of the light traveling through the retardation plate 53, with respect to a spatially fixed point, takes the form of a helix.

In its form as a dichroic or birefringent film, the polarizing element 52 has a particularly thin and space-saving design. Moreover, both the polarizing film 52 and the quarter-wave layer 53 can be applied onto the curved optical element 9 in a particularly simple and cost-effective manner by way of lamination.

In an alternative form, it is also possible for the linearly polarizing element 52 to be designed as a birefringent element, for example as a Nicol or Glan-Thompson prism. In a further alternative embodiment, the linear polarization is achieved by reflection, preferably at the Brewster angle, at transparent plates, for example made from glass or plastic, which are arranged in series and are tilted with respect to the propagation direction of the light.

As already explained in connection with FIG. 3, portions of the unpolarized light 54 that is incident from the outside, such as sunlight, are prevented from penetrating into the projection apparatus 3 by being reflected at the concave side of the curved optical element 9 and steered onto the beam trap 41 and being absorbed here. The remaining portions of the incident light 54, on the other hand, pass through the optical element 9, which is provided with the circular polarizer 51, and are converted in the process into circularly polarized light 55.

Surfaces of the optical elements 56 arranged in the interior of the projection unit, for example of the imaging unit, a filter or a lens, reflect the circularly polarized light 55 to a specific extent in accordance with the Fresnel equations. The propagation direction of the reflected circularly polarized light 57 is now the same as that of the light emitted by the imaging unit (not illustrated). The reflected circularly polarized light 57 is thus now again incident on the curved optical element 9, where it travels first through the quarter-wave layer 53. The reflected circularly polarized light 57 is hereby converted again into linearly polarized light, having a polarization direction which, owing to the opposite propagation direction, is perpendicular to the first axis of the linearly polarizing element 52 that is situated therebehind. Since only components of the light that are parallel with respect to the first axis of the linearly polarizing element 52 are transmitted, the linearly polarizing element 52 acts as a filter and prevents the exit of the majority of the reflected circularly polarized light 57, such that only a fraction of the reflected circularly polarized light 57 is incident on the projection surface 6 as output linearly polarized light 58. The output linearly polarized light 58, however, is of such low intensity due to the described measures that, after reflection at the projection surface 6, it is no longer perceived as a disturbing reflection in the field of view of the driver.

In order to ensure particularly reliable circular polarization of the light traveling through the curved optical element 9, the function of the circular polarizer 51 is adapted to the angle of incidence a of the unpolarized light which is incident onto the curved first side of the optical element 9 from the outside. In this way, attenuation of the intensity of the output linearly polarized light 58 with respect to the incident unpolarized light 54 by a factor of 200 to 250 is achieved.

In summary, it can be stated that the curved optical element 9, which acts as the exit window of the projection unit and is provided with a circular polarizer 51, or is in the form of a circular polarizer 51, contributes in two respects to the reduction or prevention of disturbing reflections in the field of view of the driver: a portion of the incident light is reflected in a controlled fashion at the curved surface of the optical element, or of the circular polarizer, onto a beam trap and thereby made harmless, while the other portion of the incident light is circularly polarized by the circular polarizer which is provided at the optical element, or by the optical element which is in the form of a circular polarizer, and, after reflection at one or more optical components in the interior of the projection unit, upon another passage through the circular polarizer, is absorbed thereby.

The light penetrating into the projection apparatus 3 can be attenuated even further by additionally providing surfaces of the optical elements 56, for example the front and/or rear side of lenses, filters and light guides, with an anti-reflective coating 59 or anti-reflective surface structures. Hereby, upon reflection of the circularly polarized light 55 at such surfaces, the intensity thereof is further decreased. Overall, the intensity of the output linearly polarized light 58 with respect to the intensity of the unpolarized light 54 that is incident from the outside falls by factor of more than 1000, with the result that it is also possible to sufficiently and reliably suppress the extremely high brightness of incident sunlight.

FIGS. 5A-5E shows examples of optical elements which can be installed, alternatively or additionally to the above-described optical elements, in the projection unit of the projection apparatus 3.

Figure 5A:
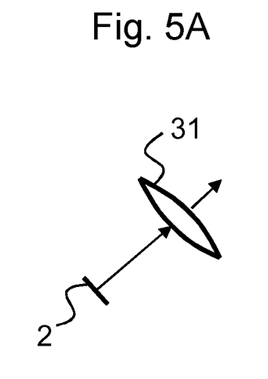
FIGS. 5A-5E shows examples of optical elements of a projection unit of a head-up display of an embodiment of the present invention that are arranged in the projection path.

In the example shown in FIG. 5A, magnifying imaging of the light that is emitted by the imaging unit 2, which is e.g. in the form of a display, is achieved by way of a lens 31 or a lens system, having a plurality of lenses which are arranged in series.

Figure 5B:
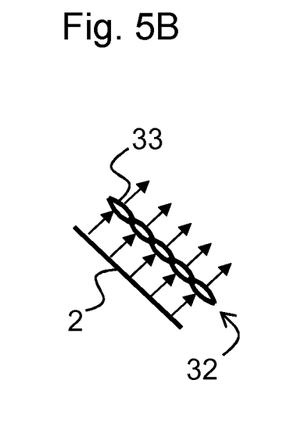

FIG. 5B shows a multi-lens array 32, having a multiplicity of small lenses 33, which are known as lenslets, with all lenslets having the same focal length and being arranged next to one another in one plane. This achieves a division of the light coming from the imaging unit 2 into a plurality of channels. The lenslets inserted into the individual channels can thereby have a very short focal length, as a result of which the installation space required for the projection unit is significantly reduced.

Figure 5C:
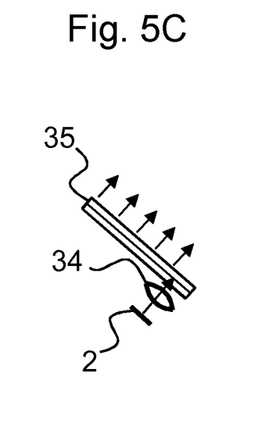

FIG. 5C shows a projection unit in which the image that is produced by the imaging unit 2, which is in the form of a display, is magnified by a lens 34 or a lens system (not illustrated) and coupled into a light guide 35 and coupled out again at a different location. This permits flexible installation of the projection unit.

Figure 5D:
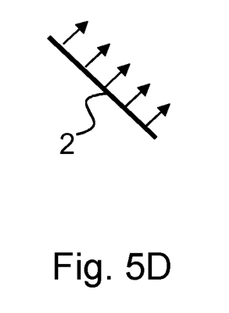

FIG. 5D shows an embodiment in which the projection apparatus has only one imaging unit 2. By designing the imaging unit 2 as a large display, a magnifying optical unit is not necessary for producing an easily discernible virtual image 7. The required installation space hereby becomes particularly small.

Figure 5E:
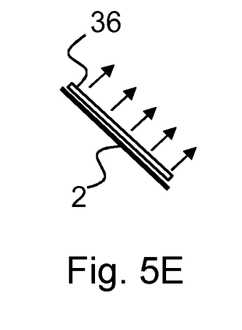

FIG. 5E shows an expansion of FIG. 5D, in which the imaging unit 2, which is in the form of a display, is provided with a parallax barrier 36 or a lenticular layer. Due to the parallax barrier 36, parts of the display are masked for in each case one of the two viewing angles of the two eyes of the driver 4, with the result that, with suitable representation of the information to be shown on the display, a stereoscopic virtual image 7 is formed in the parts of the display which are defined by the parallax barrier 36. The same effect is achieved with the lenticular layer, which is formed from lenslets on the display, which steer the view from two different viewing angles onto different, defined parts of the display. Due to the stereoscopic representation of the information to be displayed, the virtual image 7 can be produced at a farther distance from the driver 4, with the result that it appears to be even better integrated into the objects in the natural field of vision of the driver 4, as a result of which so-called contact analogy is further improved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS 1 head-up display
2 imaging unit
3 projection apparatus
4 driver
5 projection path
6 projection surface
7 virtual image
8 housing of the projection unit
9 curved optical element
10 exit window
11 sun/sunlight
12 mirror
13 concave mirror
31 lens/lens system
32 lens array
33 lenslet
34 lens/lens system
35 light guide 36 parallax barrier
41 beam trap
51 circular polarizer
52 linearly polarizing element
53 quarter-wave layer
54 unpolarized incident light
55 circularly polarized light
56 optical element
57 reflected circularly polarized light
58 output linearly polarized light
59 anti-reflective coating

What is claimed is:

1. A head-up display projection apparatus, comprising:
an imaging unit configured to produce an image;
a projection unit configured to project the image produced by the imaging unit via a projection path onto a projection surface; and
a curved optical element having or formed as a circular polarizer arranged in the projection path,
wherein
the circular polarizer includes a linearly polarizing element and a quarter-wave layer,
the quarter-wave layer is arranged, as viewed in a direction of the projection path, upstream of the linearly polarizing element,
the optical element is as a curved transparent plate in the form of a curved glass or plastics plate, on which the circular polarizer is coupled,
the circular polarizer is laminated with the curved glass or plastics plate,
a first side of the optical element is concavely curved and a second side of the optical element is convexly curved, and
the circular polarizer is coupled to the second side of the optical element.

2. The projection apparatus as claimed in claim 1, wherein the first side of the optical element faces the projection surface and the second side of the optical element faces the projection unit.

3. The projection apparatus as claimed in claim 2, wherein the imaging unit, projection surface, projection unit and curved optical element are arranged to form a beam trap which absorbs light rays incident on and reflected at the first side of the optical element.

4. The projection apparatus as claimed in claim 3, wherein the projection unit includes at least one further optical element having an anti-reflective coating.

5. The projection apparatus as claimed in claim 4, wherein the at least one further optical element is a mirror, a mirror system, a lens, a lens system or a light guide.

6. The projection apparatus as claimed in claim 5, further comprising:
a housing configured to enclose the projection unit and having an exit window through which the image produced by the imaging unit is projectable onto the projection surface,
wherein the exit window is formed by the optical element.

7. A head-up display, comprising:
an imaging unit configured to produce an image;
a projection surface;
a projection unit configured to project the image produced by the imaging unit via a projection path onto the projection surface; and
a curved optical element having or formed as a circular polarizer arranged in the projection path,
wherein
the circular polarizer includes a linearly polarizing element and a quarter-wave layer,
the quarter-wave layer is arranged, as viewed in a direction of the projection path, upstream of the linearly polarizing element,
the optical element is as a curved transparent plate in the form of a curved glass or plastics plate, on which the circular polarizer is coupled,
the circular polarizer is laminated with the curved glass or plastics plate,
a first side of the optical element is concavely curved and a second side of the optical element is convexly curved, and
the circular polarizer is coupled to the second side of the optical element, and
the projection surface is a front window of a vehicle.

8. A vehicle, comprising:
an imaging unit configured to produce an image;
a projection surface;
a projection unit configured to project the image produced by the imaging unit via a projection path onto the projection surface;
a curved optical element having or formed as a circular polarizer arranged in the projection path; and
a front window of the vehicle,
wherein
the circular polarizer includes a linearly polarizing element and a quarter-wave layer,
the quarter-wave layer is arranged, as viewed in a direction of the projection path, upstream of the linearly polarizing element,
the optical element is as a curved transparent plate in the form of a curved glass or plastics plate, on which the circular polarizer is coupled,
the circular polarizer is laminated with the curved glass or plastics plate,
a first side of the optical element is concavely curved and a second side of the optical element is convexly curved, and
the circular polarizer is coupled to the second side of the optical element, and
the front window of the vehicle is the projection surface.

* * * * *